Jan. 27, 1925.
J. P. EVERETT
1,524,122
DIRIGIBLE LAMP
Filed May 28, 1923
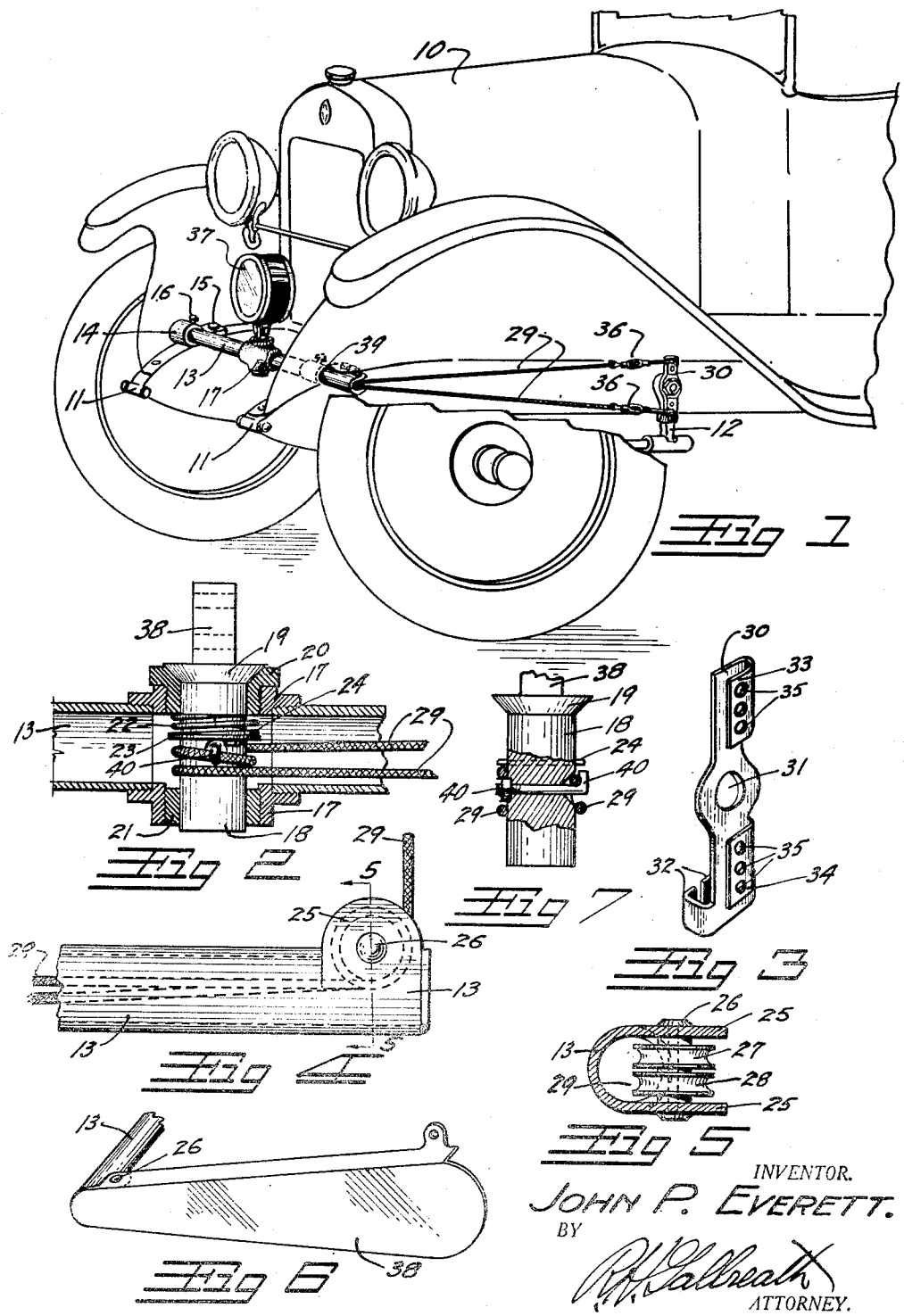
INVENTOR.
JOHN P. EVERETT.
BY
ATTORNEY.

Patented Jan. 27, 1925.

1,524,122

UNITED STATES PATENT OFFICE.

JOHN P. EVERETT, OF DENVER, COLORADO.

DIRIGIBLE LAMP.

Application filed May 28, 1923. Serial No. 641,924.

*To all whom it may concern:*

Be it known that I, JOHN P. EVERETT, a citizen of the United States of America, residing at Denver, in the county of Denver and State of Colorado, have invented certain new and useful Improvements in Dirigible Lamps, of which the following is a specification.

This invention relates to dirigible lights, more particularly of the type adapted to be attached to automobiles as an accessory without disturbing the present lighting system.

The principal object of the invention is to provide a device of this character which can be attached to an automobile with a minimum of labor.

Another object is to provide a dirigible automobile light having a minimum of working parts.

A further object is to provide a dirigible light accessory in which the lamp will be free from the vibration of the axle of the automobile.

A still further object is to provide means in the lamp bearing for automatically taking up the wear at this point.

Other objects and advantages reside in the detailed construction of the invention, which result in simplicity, economy and efficiency, and which will become more apparent from the following description.

In the following detailed description of the invention reference is had to the accompanying drawing which forms a part hereof. Like numerals refer to like parts in all views of the drawing and throughout the description.

In the drawing:

Fig. 1 is a perspective view of the forward portion of an automobile showing the invention attached.

Fig. 2 is a vertical cross section through the lamp bearing.

Fig. 3 is a detail perspective view of the operating lever arm.

Fig. 4 is a fragmentary plan view of the pulley end of the cross rod.

Fig. 5 is a detail cross section taken on the line 5—5 Fig. 4.

Fig. 6 is a detail perspective view of a cover which might be employed to cover the operating cables.

Fig. 7 is a detail view of a method for securing the operating cable to the lamp shaft.

Let the numeral 10 designate an automobile, the numeral 11 the forward projecting extremities of the chassis members of said automobile, and the numeral 12 the steering gear ball arm thereof.

The invention comprises a tubing 13 secured at any convenient point on the chassis members 11 by means of collars 14 and bolts 15. Tubing 13 is held in any desired position in the collars 14 by lock nuts 16 threaded therein. The tubing 13 is formed in two sections, which are secured together at the midpoint, between the collars 14, by a housing 17 into which the sections are threaded, as shown in Fig. 2.

A vertical shaft 18 passes through the housing 17 and carries a conical bearing ring 19 which rests in a conical seat formed in a bushing 20 secured in the top of the housing 17. The lower extremity of the shaft 18 bears in a bushing 21 secured in the lower part of the housing 17. Shaft 18 is held in place in the housing 17 by means of a helical spring 22 which is compressed between the bushing 20 and a washer 23 held in place on the shaft 18 by a pin 24. It will be noted that any wear in the bushing 20 will be taken up by the spring 22, thereby preventing the shaft 18 from becoming loosened.

On one extremity of the tubing 13, ears 25 are formed, which carry a short shaft 26 upon which two pulleys 27 and 28 are rotatably mounted, as shown in Fig. 5.

A flexible cable 29 is passed around the shaft 18 and over the pulleys 27 and 28 connecting at each of its extremities with an operating lever arm 30 which is secured to the steering gear ball arm 12 of the automobile, as shown in Fig. 1.

Lever arm 30 is preferably formed of sheet metal as shown, and is provided with an opening 31, for engaging the automobile steering worm shaft; flaps 32, which are bent around the steering gear ball arm after the lever 30 is in place; and two bent back portions 33 and 34 provided with openings 35, for connecting with the extremities of the cable 29. Turnbuckles 36 are provided in the cables 29 to take up any slack therein, and if desired tension springs could be inserted in the cable to constantly keep it taut.

A lamp 37 is secured in any suitable manner to the upper extremity 38 of the shaft 18. It will be readily understood from the foregoing that any movement of the steering gear ball arm 12 of the automobile 10, will be transmitted, through the cable 29, to cause the shaft 18 to rotate the lamp 37.

Various automobiles have various lengths and various arcs of movement for their arms 12, for this reason it is necessary to provide means for adjusting the length of the lever arm 30 in order to obtain the proper radius of action for the dirigible lamp. This adjustment is obtained by connecting the cables 29 with the proper two of the various openings 35 in the operating lever 30.

A sheet metal cover 38 may be secured if desired to the extremity of the tubing 13, and extended rearward to cover the operating cable 29. Cable 29 is prevented from sliding upon the shaft 18 by a clamp bolt 40, shown in detail in Fig. 7 extending through the shaft 18, which clamps the cable 29 securely to the shaft.

Most types of automobiles have bolts upon the upper sides of the forward projecting chassis members 11 for securing the fender pans thereto. One of these bolts could be utilized in each chassis member for securing the collars 14, so that it would be unnecessary to drill or tap any holes for the installation of this invention. The only change in the present equipment would be to cut an opening in one of the fender pans as shown at 39 Fig. 1, on those automobiles which have pans at this point. On automobiles having a short starter crank the tubing 13 could be placed forward, and on those having a long starter crank the tubing 13 could be placed near the radiator so that it would not interfere with the use of the crank.

While a specific form of the improvement has been described and illustrated herein, it is desired and understood that the same may be varied, within the scope of the appended claims, without departing from the spirit of the invention.

Having thus described the invention, what is claimed and desired secured by Letters Patent is:—

1. A dirigible automobile lamp comprising a tubing adapted to be connected between the forward projecting chassis members of the automobile; a housing mounted on said tubing; a vertical lamp carrying shaft rotatably mounted in said housing, a cable surrounding said shaft and fastened thereto, pulleys in said tubing for the reception of said cable and means for securing said cable to the steering mechanism of said automobile, said means comprising a lever arm secured on the steering worm-gear shaft of the automobile and connecting at its extremities to the extremities of said cable.

2. A dirigible automobile lamp comprising a tubing adapted to be connected between the forward projecting chassis members of the automobile; a housing mounted on said tubing; a vertical lamp carrying shaft rotatably mounted in said housing, a cable surrounding said shaft and fastened thereto, pulleys in said tubing for the reception of said cable and means for securing said cable to the steering mechanism of said automobile, said means comprising a lever arm adapted to be placed over the extremity of the steering worm shaft of said automobile, and secured to the steering gear ball arm, said lever being provided with a series of openings for varying the effective length of said lever and adapted to be engaged by the extremities of said cable.

3. A dirigible automobile lamp comprising a tubing adapted to be connected between the forward projecting chassis members of the automobile; a housing mounted on said tubing; a vertical lamp carrying shaft rotatably mounted in said housing; a cable surrounding said shaft and fastened thereto, pulleys in said tubing for the reception of said cable and means for securing said cable to the steering mechanism of said automobile, said means comprising a lever arm secured on the steering worm gear shaft of the automobile and connecting at its extremities to the extremities of said cable, said lever arm having an opening at its middle for the reception of said gear shaft and being provided with angularly bent portions adapted to engage the ball crank arm of said automobile.

4. A dirigible headlight mounting for automobiles comprising, in combination a horizontal tube formed in two sections joined by a housing carrying a vertical bearing, one of said sections being provided at its free extremity with projecting lugs between which pullies are mounted; a vertical lamp supporting shaft mounted in said bearing; a lever arranged to be secured to the steering mechanism of said automobile and cable secured at its extremities to said lever and passing around said pullies and said vertical lamp supporting shaft.

In testimony whereof I affix my signature.

JOHN P. EVERETT.